United States Patent

[11] 3,600,753

| [72] | Inventor | Melvin Otto |
| --- | --- | --- |
| | | Gladwin, Mich. |
| [21] | Appl. No | 861,636 |
| [22] | Filed | Sept. 29, 1969 |
| [45] | Patented | Aug. 24, 1971 |
| [73] | Assignee | Koehring Company |
| | | Milwaukee, Wis. |

[54] DIFFERENTIAL PRESSURE FORMING MOLD ASSEMBLY FOR FORMING PLASTIC ARTICLES IN A THERMOPLASTIC WEB
9 Claims, 8 Drawing Figs.

| [52] | U.S. Cl. | 18/19 F |
| --- | --- | --- |
| [51] | Int. Cl. | B29c 17/04 |
| [50] | Field of Search | 18/19 F, 19 R, 35, DIG. 60 |

[56] References Cited
UNITED STATES PATENTS

| 3,283,045 | 11/1966 | Thiel | 18/19 F X |
| --- | --- | --- | --- |
| 3,305,158 | 2/1967 | Whiteford | 18/19 F UX |
| 3,342,914 | 9/1967 | Edwards | 18/19 F X |
| 3,346,923 | 10/1967 | Brown et al | 18/19 F |
| 3,507,007 | 4/1970 | Martin | 18/19 F |

*Primary Examiner*—Robert L. Spicer, Jr.
*Attorney*—Learman and McCulloch

ABSTRACT: A differential pressure forming mold wherein a sheet of deformable plastic is supported between a mold assembly having a plurality of article forming mold cavities and an opposed mold assembly having a plurality of cavity aligned, projecting plug assists. A plate incorporated with the mold assembly having the plug assists and operative to prevent ballooning of portions of the sheet surrounding those portions which are moved into the mold cavities by the plug assists has openings for passing the plug assists and is mounted for relative movement with the plug assists. The plate is moved toward the mold assembly having the mold cavities and engages the mold assembly having the mold cavities to clamp the edges of the plastic sheet thereto, prior to the time the plug assists are moved into the cavities to stretch the sheet and mechanically move portions of the sheet into the mold cavities. Thereafter a differential pressure condition is created to move the sheet portions finally into intimate engagement with the mold cavities.

Patented Aug. 24, 1971 3,600,753

INVENTOR.
MELVIN OTTO
BY

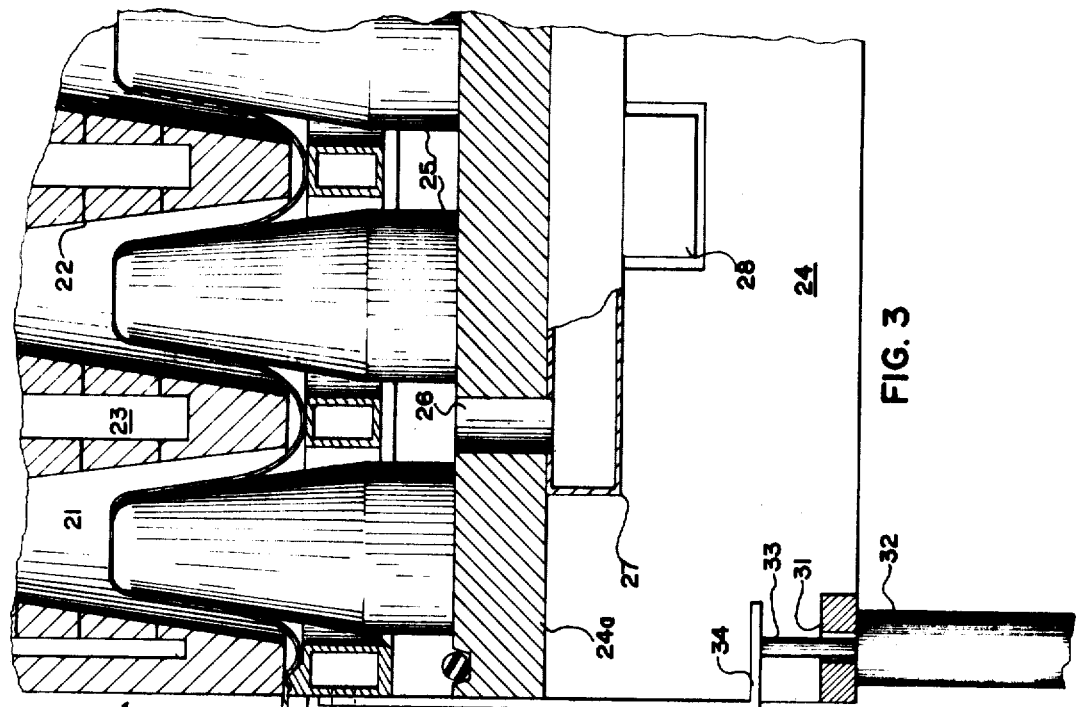
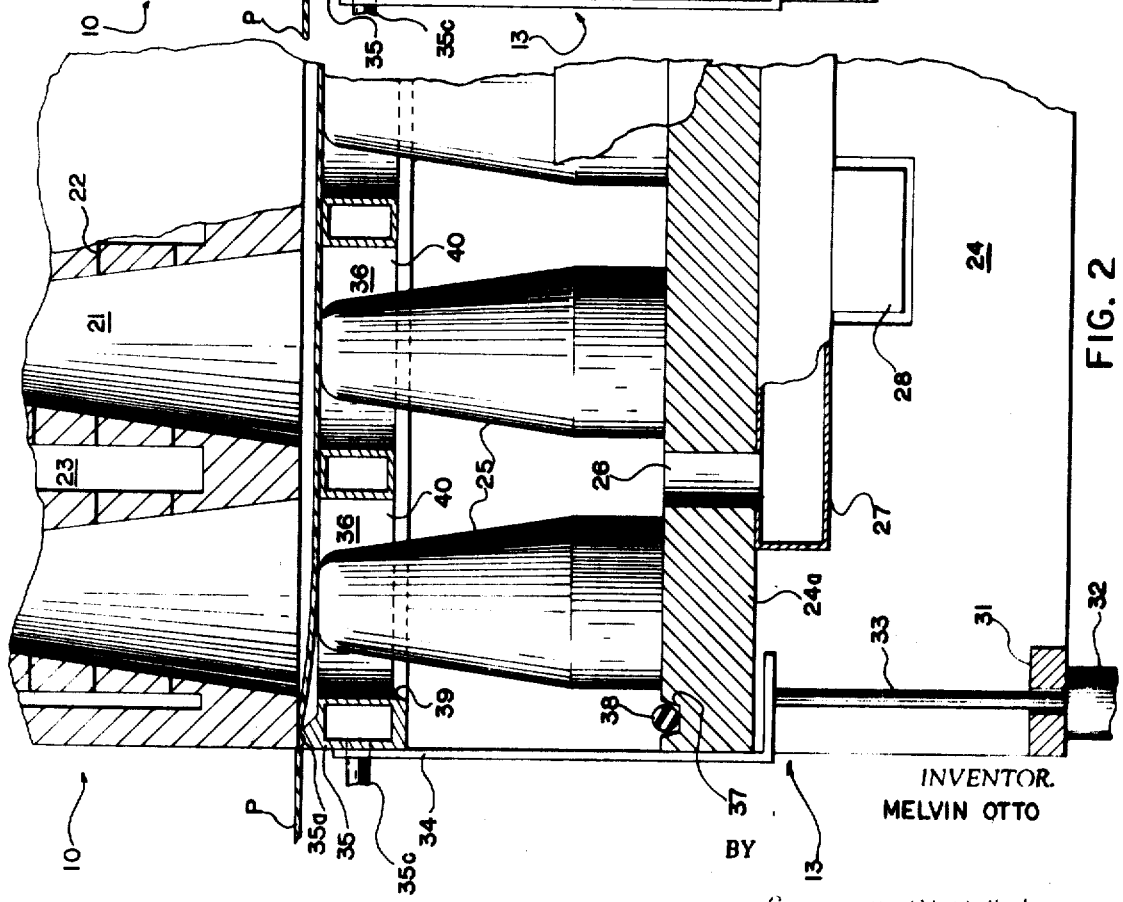

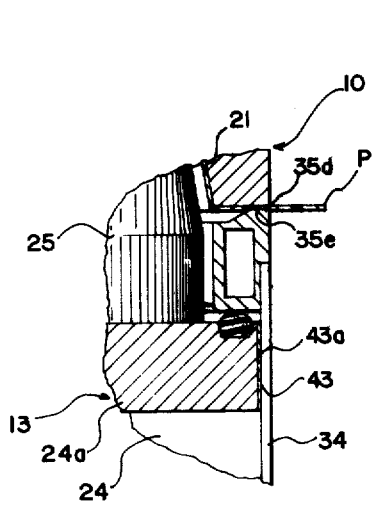
FIG. 8
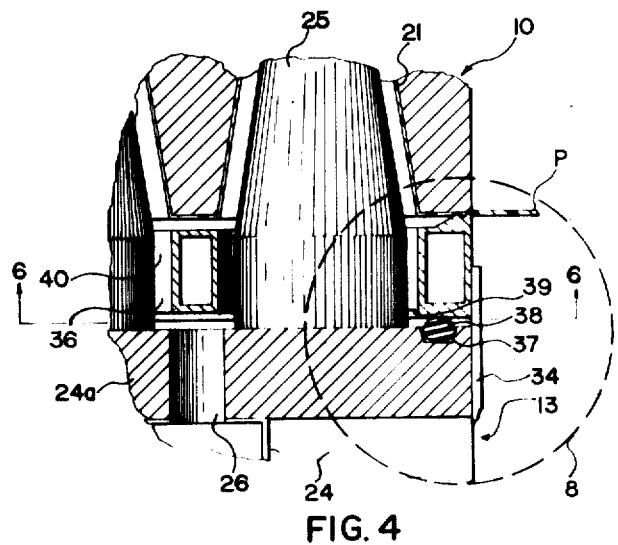
FIG. 4
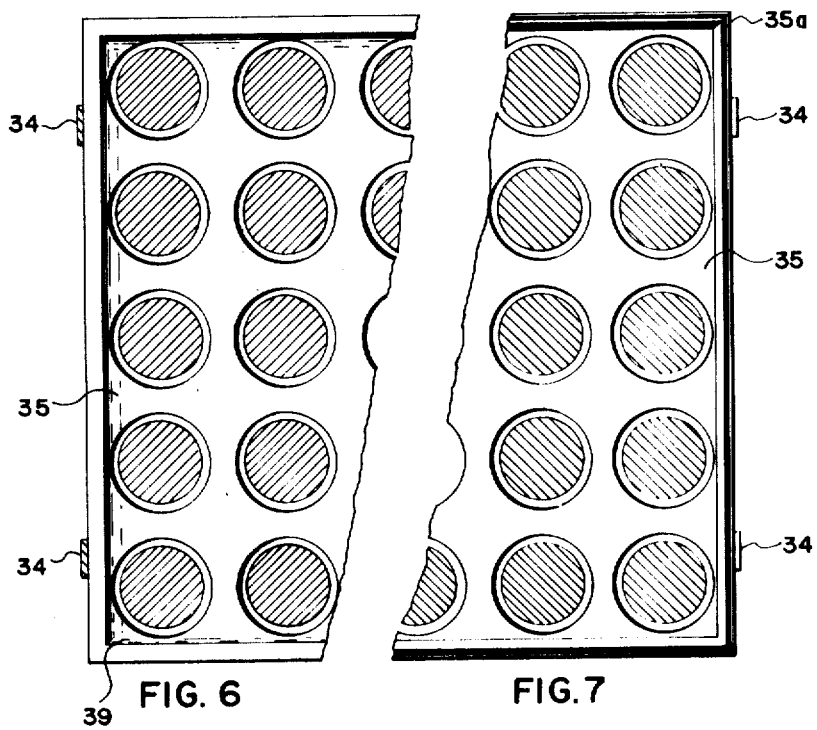
FIG. 6
FIG. 7
INVENTOR.
MELVIN OTTO
BY
Learman & McCulloch

DIFFERENTIAL PRESSURE FORMING MOLD ASSEMBLY FOR FORMING PLASTIC ARTICLES IN A THERMOPLASTIC WEB

The invention is related broadly to differential pressure forming equipment for forming articles such as containers in sheets of various thermoplastic materials such as polystyrene, polyethylene, and polypropylene to specify a few. Thermoforming equipment of this nature, suitable for processing a wide variety of plastic materials is well known, and as will later appear, applicants Assignee has patented various improvements in machines of this general character.

One of the prime objects of the present invention is to design a mold assembly for machines of this character wherein the plate which has formerly been utilized to prevent ballooning of the plastic sheet around the cavities is also utilized to function as a clamp frame, thereby eliminating the need of providing a separate clamp frame without eliminating its function.

Another object of the invention is to provide a construction of the type described wherein the various parts are suitably sealed so that there are no leaks in the suction or pressurized air systems which are utilized to create the differential pressure utilized in the forming operation.

Still another object of the invention is to provide an economical and reliable mold construction which is eminently suited to performing the functions necessary to produce parts of the highest quality.

Other objects and advantages will become apparent from reading the appendant descriptive material and claims, and by reference to the accompanying drawings wherein:

FIG. 2 is an enlarged, fragmentary, sectional side elevational view of the mold of the invention, the upper and lower mold assemblies being shown in a still separated position in which they have moved from a more separated position toward the plastic sheet or web to clamp it there between preparatory to forming it;

FIG. 3 is a similar view with the lower mold assembly being shown in a position in which the plug assist members have moved partly into the mold cavities;

FIG. 4 is an enlarged fragmentary view of the encircled portion shown in FIG. 1 with the mold assemblies being shown in a position in which the plug assists have fully entered the mold cavities and a seal have been achieved so that air under pressure can be introduced to assist in the forming operation;

FIG. 6 is a fragmentary enlarged inverse sectional plan view taken on the line 6—6 of FIG. 1;

FIG. 7 is a fragmentary enlarged, sectional top plan view taken on the line 7—7 of FIG. 1 and particularly illustrating the clamp plate;

FIG. 8 is a fragmentary sectional side elevational view similar to FIG. 4 and illustrating a modified embodiment of the invention.

Figure 5:
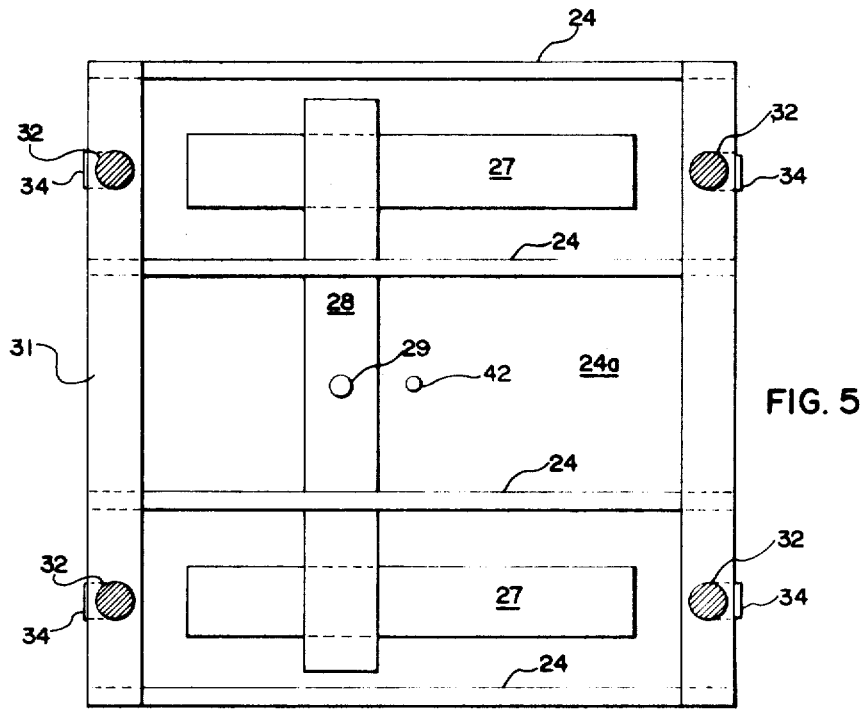
FIG. 5 is an inverse, sectional plan view taken on the line 5—5 of FIG. 1.
Figure 1:
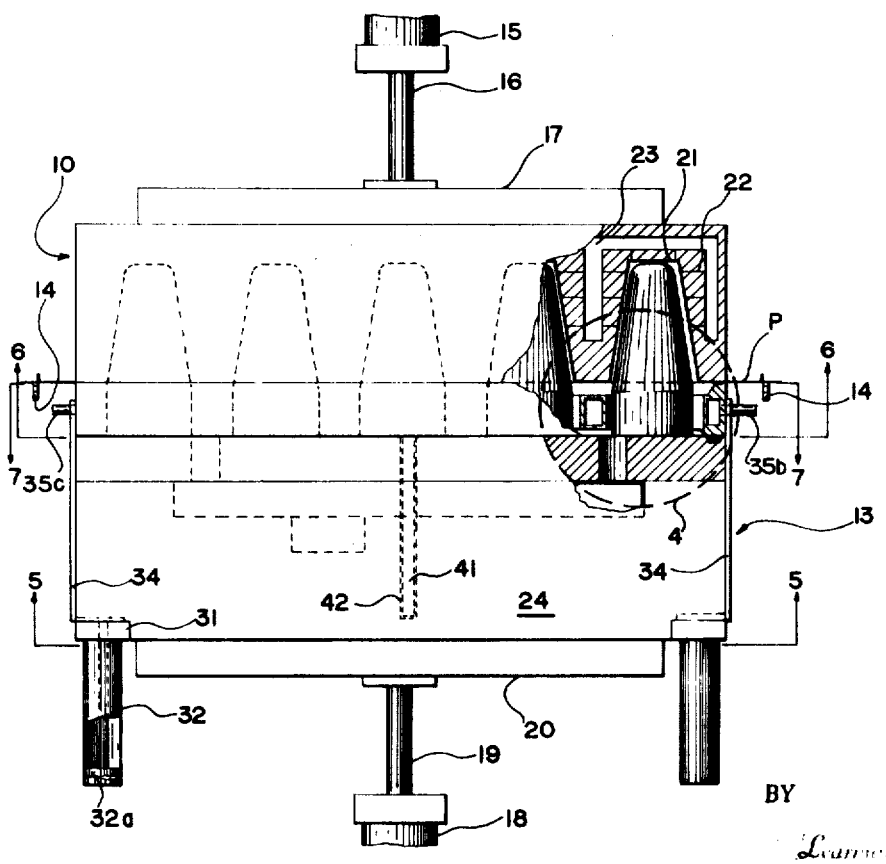
FIG. 1 is a somewhat schematic, side elevational view of the mold of the invention with the upper and lower mold assemblies being shown in closed sheet forming position.

Referring now more particularly to the accompanying drawings, and in the first instance to FIG. 1, the mold includes, as usual, an upper female mold assembly, generally designated 10, mounted on a suitable differential pressure forming machine frame of the type, for instance, illustrated in the present Assignee's U.S. Pat. No. 3,346,923. Also mounted by the machine frame is the lower mold assembly, generally designated 13, which is mounted for vertical travel toward and away from the upper mold assembly 10 and a plastic web or sheet generally designated P which is supported as usual for indexing movement on sheet advancing chain members 14. The upper mold assembly 10 is moved vertically toward and away from the plastic sheet P by a suitable fluid pressure actuated cylinder 15 having a piston rod 16 connected with upper platen 17. Similarly, the lower mold assembly 13 is moved to and from the plastic sheet P by a fluid pressure actuated cylinder 18 having a piston rod 19 connected to a lower platen member 20. As in the aforementioned United States patent, toggle linkage mechanism (not shown) may be provided to finally lock the mold assemblies in a fully closed position in which the plastic sheet P is clamped therebetween.

The upper mold assembly 10 will be only briefly described inasmuch as it is of a conventional nature. It includes, as usual, the mold cavities 21 which are connected with a vacuum manifold in the usual manner by ports 22 and annular passages 23. At a proper time in the forming operation, the vacuum manifold in mold assembly 10 will be connected via the usual valve with a suitable vacuum pump to assist the movement of portions of the plastic web P into intimate engagement with the cavity walls 21.

The lower mold assembly 13 includes a channel shaped mold frame 24 providing a top base plate 24a on which the usual plug assist members 25 are fixed in axial alignment with the mold cavities 21. Provided in the member 24a in the usual manner, are air passages 26 which lead from air box or channel members 27 which may be connected by a connecting manifold 28 through a hose connection 29 to a suitable source of air pressures such as an air compressor. As will later become apparent, air is introduced to the manifold 28 through a flexible hose at a proper time via the usual valve during the forming operation to assist suction forces in moving the plastic sheet into intimate engagement with the cavity walls 21.

Mounted on the sidewalls of the channel shaped mold casing 24 are crosspieces 31 to which air cylinders 32 may be fixed as shown in FIG. 1. The cylinders 32 have piston rods 33 mounting angle shaped bracket arms 34 which support a tubular plate 35 having enlarged openings 36 for passing the plug assist members 25. A similar tubular plate through which coolant may be passed is shown in the present Assignee's copending patent application ser. No. 636,913, now U.S. Pat. No. 3,507,007 entitled "Differential Pressure Plastic Forming Equipment," and filed on May 8, 1967, by Raymond H. Martin, which is incorporated herein by reference. Coolant fluid such as water at room temperature may be pumped through the plate 35 via an inlet tube 35b and an outlet tube 35c. Air is permanently maintained in the cylinders 32 beneath the pistons 32a which is compressed when relative movement occurs between the plate 35 of the lower mold assembly and the frame 24 of the lower mold assembly as will later be explained. It will be observed that the upper surface of the hollow plate 35 is provided with a perimetral groove 35a defining edges 35d and 35e which aid in achieving an airtight seal between the member 35 and the upper mold 10 when these members are clamped to the plastic sheet P. Also, a perimetral groove 37 is provided in the plug assist supporting plate 24a to receive a rectangular sealing ring 38 which provides an airtight seal between the plate 24a and plate 35 when these parts are engaged as shown in FIG. 4. It should be observed that the lower surface of plate 35 is recessed as at 39 (see FIG. 4). With recess 39, air under pressure supplied through ports 26 is able to circulate through recess 39 to the annular channels 40 provided between the plate cavities 36 and plug assists 25 when the plug assists 25 have moved all the way into cavities 21 as shown in FIG. 4.

In operation, the fluid pressure cylinder 15 is first operated to move the upper mold 10 to the sheet clamping position. Thereafter, the cylinder 18 may be operated to move the mold 13 to the sheet clamping position shown in FIG. 2 wherein clamp plate 35 clamps the edges of the plastic web in position. Thereafter, the lower cylinder 18 continues to move the mold 24 upwardly to cause the plug assists 25 to stretch portions of the plastic web into the mold cavities 21 in the manner illustrated in FIG. 3. During this time plate 35 prevents ballooning of the web portions surrounding the cavities 21. Moreover, the further the plug assists 25 move, the greater the compression of the air in cylinders 32 and the more tightly are the cooled and "set" edges of the plastic sheet clamped. When the plug assists 25 have moved sufficiently into the cavities 21 to engage the seal ring 38 with the plate 35, air may be released to the manifold 28 simultaneously with the communication of suction forces with the ports 22 to complete the forming operation. Thereafter, once the suction forces and air pressure source have been discommunicated, the fluid pressure cylinder 18 is, first of all, operated to move the mold member 24 and plug assist 25 downwardly out of cavities 21. The plate 35 remains in engagement with the plastic sheet P for a time while the clamping pressure is gradually relieved as the cylinders 32a descend. Thereafter, the upper mold assembly 10 is also raised and the plastic sheet P is in a position to be indexed to move the containers formed therein to a position beyond the mold assembly and dispose another portion of the web between the upper and lower mold assemblies 10 and 13.

The construction described, permits the elimination of the clamp ring which has been formerly used, the plate 35 functioning not only as a clamp ring but also as a coolant plate for preventing ballooning of the web portions between the cavities 21. Additionally, the plate 35 furnishes a sealing surface for the sealing ring 38 and at the desired time permits the introduction of the air under pressure which assists in the final forming.

Provided to maintain the alignment of the plate 35 and the mold frame 24 during relative vertical movement is a pin 41, (see FIG. 1) which depends from the plate 35 off center with respect to plate 35 and is received in a corresponding housing 42 disposed off center in the mold plate 24. Because the housing 42 is closed except at its upper end, there is no danger of loss of air pressure at this point.

Alternatively, the plate 24a may be provided with alignment maintaining edge grooves 43 as shown in FIG. 8, which illustrates a slightly modified construction, the grooves 43 having slide bushings 43a receiving the arms 34 and functioning in place of the pin 41 and tube 42 to maintain the relative alignment of plate 35 and mold plate 24 doing relative vertical movement of the two members.

The scope of the invention is defined in the appended claims.

I claim:

1. In differential pressure forming apparatus for forming synthetic plastic parts in a plastic sheet: opposed mold assemblies, one mold assembly having a plurality of mold cavities and the other comprising a plug assist support from which a plurality of plug assists, aligned with said cavities, project; means for supporting a deformable sheet of plastic in which parts are to be formed between said mold assemblies; means for relatively moving said mold assemblies from separated to engaged positions to cause said plug assists to enter said cavities and move portions of the plastic sheet into said cavities, and from engaged to separated positions to relatively withdraw said plug assists; plate means mounted for movement independently of said plug assist support for preventing ballooning of portions of the sheet around said first mentioned portions, and having through openings aligned with said cavities for passing said plug assists; means for moving said plate means in a direction toward the said one mold assembly and pressing the sheet against the said one mold assembly so that it also acts as a clamp frame for the sheet at the time said plug assists engage the sheet of plastic; and means for applying a differential pressure to opposite sides of the sheet to move the sheet finally into intimate engagement with the mold cavities.

2. The combination defined in claim 1 wherein said means for applying a differential pressure includes means for supplying air under pressure to said mold assembly having plug assists; and sheet engaging projection means is provided on said plate means to act as a seal for the air supplied.

3. The combination defined in claim 1 in which said plate means comprises a hollow member; and means is provided for circulating coolant therethrough.

4. The combination defined in claim 1 in which said means for relatively moving said mold assemblies includes means for moving said other mold assembly to and fro; and said means for causing said plate means to move includes a lost motion connection between said means for moving said other mold assembly and said plate means and means for biasing said plate means in a direction to urge it toward said one mold assembly upon further movement of the other mold assembly, when the plate means engages the one mold assembly.

5. The combination defined in claim 4 in which the means defined by the dependent claim comprises a fluid pressure operated cylinder for moving said other mold assembly to and fro, and biasing cylinder means connecting said mold assembly and plate means and having a fluid chamber with fluid which is compressed when said plate means engages said one mold assembly and said other mold assembly continues its movement to dispose said plug assists in said mold cavities.

6. The combination defined in claim 1 in which said plug support includes a plug plate from which said plug assists project; and perimetral seal means is mounted to seal the space between said plate means and plug plate when the two are moved substantially into engagement.

7. The combination defined in claim 6 in which said plug plate has a perimetral groove in its upper surface and said seal means comprises a seal ring disposed therein and projecting out of said groove.

8. The combination defined in claim 6 in which a dependent guide pin is provided on said plate means and is telescopically received in a casing provided on said plug plate.

9. The combination defined in claim 5 in which said plate means and said one mold assembly are flush when clamped together and bars connecting said biasing cylinder means and plate means are received in grooves in said plate means.